United States Patent [19]
Fujimura et al.

[11] Patent Number: 5,251,933
[45] Date of Patent: Oct. 12, 1993

[54] SEAT BELT RETRACTOR

[75] Inventors: Yoshiichi Fujimura, Shiga; Masahiro Tanabe, Nagahama, both of Japan

[73] Assignee: Takata Corporation, Tokyo, Japan

[21] Appl. No.: 820,595

[22] PCT Filed: Jun. 21, 1991

[86] PCT No.: PCT/JP91/00844
§ 371 Date: Jan. 23, 1992
§ 102(e) Date: Jan. 23, 1992

[87] PCT Pub. No.: WO92/00210
PCT Pub. Date: Jan. 9, 1992

[30] Foreign Application Priority Data
Jun. 28, 1990 [JP] Japan .................. 2-171188

[51] Int. Cl.⁵ .............................. B60R 22/36
[52] U.S. Cl. .................. 280/806; 242/107.2
[58] Field of Search .......... 280/806; 297/478; 267/141.2, 141.3; 242/107.2

[56] References Cited
U.S. PATENT DOCUMENTS

| | | | |
|---|---|---|---|
| 4,036,322 | 7/1977 | Takada | 280/806 |
| 4,359,237 | 11/1982 | Gavagan et al. | 280/806 |
| 4,522,378 | 6/1985 | Nelson | 267/141.4 |
| 4,687,253 | 8/1987 | Ernst et al. | 297/478 |
| 4,991,874 | 2/1991 | Tsuge et al. | 280/806 |
| 4,993,746 | 2/1991 | Hagelthorn | 280/806 |

FOREIGN PATENT DOCUMENTS
1232427  1/1967  Fed. Rep. of Germany ...... 280/806

Primary Examiner—Eric D. Culbreth
Attorney, Agent, or Firm—Kanesaka & Takeuchi

[57] ABSTRACT

A seat belt retractor is formed of a frame having a pair of opposite side walls and a rear wall, a seat belt take-up reel situated between the side walls, a first gripping member mounted on the rear wall, a shaft extending between the side walls, a second gripping member rotationally disposed over the shaft, and a lock actuating device to move the second gripping member. The second gripping member includes a support hole at one side and a pusher at the opposite side, and can rotate to hold a seat belt between the pusher and the first gripping member. A sleeve made of synthetic resin is attached to the second gripping member such that a cylindrical portion is located inside the support hole and a flange projects outwardly from an outer surface of the second gripping member. When a predetermined acceleration of the vehicle is not detected, the second gripping member does not directly contact the shaft and the frame by the sleeve to reduce noise. When the predetermined acceleration is detected, the sleeve may deform to allow the second gripping member to directly contact the shaft. Thus, the seat belt is securely retained between the first gripping member and the pusher.

3 Claims, 5 Drawing Sheets

SEAT BELT RETRACTOR

TECHNICAL FIELD

The present invention relates to a retractor for use in a seat belt system mounted in an automotive vehicle and particularly, to a seat belt retractor lockable to prevent extraction of a seat belt in emergency situations such as a vehicle collision.

BACKGROUND ART

Conventionally, a seat belt system is mounted in a vehicle seat to protect an occupant in emergency situations such as a vehicle collision. The seat belt system includes a retractor attached to a vehicle rigid member to take up a seat belt.

This retractor is adapted to permit extraction of the seat belt when the seat belt is fastened around the occupant. The seat belt can also be extracted in a nonemergency situation so as not to restrain the occupant. In a vehicle collision or other emergency situations, the resultant impact or acceleration is sensed to cause a reel lock mechanism to lock a reel around which the seat belt is wound. Locking of the reel enables the seat belt to restrain the occupant or prevent sudden movement of the occupant to protect the occupant.

The reel lock mechanism is able to stop rotation of the reel per se. However, if the seat belt is loosely wound around the reel, then further extraction of the seat belt may occur, even if the reel is firmly locked. To prevent this, there has previously been proposed a seat belt retractor as shown in FIGS. 5 and 6. FIG. 6 is a sectional view taken on the line VI—VI in FIG. 5.

In FIG. 5, a seat belt retractor 201 comprises a frame 205 including a pair of side walls 202, 203 and a rear wall 204 extending between the side walls 202, 203, a pendulum 206 oscillatable when excessive impacts are applied, a ratchet 208 connected to a reel (not shown) around which a seat belt 207 is wound, a link 210 including a pawl 209 engageable with teeth of the ratchet 208 and moved up as the ratchet 208 is rotated, a first gripping member 211 mounted to the rear wall 204 of the frame 205, and a shaft 212 extending between the side walls 202, 203, and a second gripping member 214 including a support hole 213 (FIG. 6) at its one end to receive the shaft 212.

As the link 210 is moved up, the free end of the second gripping member 214 is moved toward the first gripping member 211. The seat belt 207 is then firmly sandwiched between the first gripping member 211 and the second gripping member 214 to prevent extraction of the seat belt 207 from the reel.

The shaft 212, the second griping member 214 and the frame 205 of the seat belt retractor 201 are all made of metal of high strength. When a vehicle is moved or vibrated, the shaft 212 is brought into metal-to-metal contact with the support hole 213 of the second gripping member 214 to cause undesirable sound. This sound makes a vehicle occupant not only feel uncomfortable, but also suspect that there may be some fault.

In the prior art, the second gripping member 214 may also be brought into metal-to-metal contact with the side walls 202, 203 of the frame 205 to cause similar undesirable sound.

DISCLOSURE OF THE INVENTION

According to a first aspect of the present invention, there is provided a seat belt retractor comprising a frame including a pair of opposite side walls and a rear wall extending between the side walls, a seat belt take-up reel extending between the side walls of the frame, a first gripping member mounted to the rear wall of the frame to grip a seat belt, a shaft extending between the side walls of the frame, a second gripping member having a support hole at its one end to receive the shaft whereby the second gripping member is pivotally supported by the frame, the second gripping member being rotated between a position where the other, free end of the second gripping member is overlapped with the first gripping member and a position in which the free end of the second gripping member is located away from the first gripping member, lock actuating means for moving the second gripping member to overlap with the first gripping member when a vehicle is in emergency situations, and a sleeve made of synthetic resin and disposed partly between the inner peripheral surface of the support hole of the second gripping member and the outer peripheral surface of the shaft, wherein the second gripping member is supported by the shaft only through the sleeve when the vehicle is in a nonemergency situation, and the sleeve is resiliently deformed to cause direct contact between the inner peripheral surface of the support hole and the outer peripheral surface of the shaft when the vehicle is in an emergency situation.

In the seat belt retractor according to the first aspect of the present invention, the sleeve made of synthetic resin is disposed between the second gripping member and the second gripping member support shaft. This prevents metal-to-metal contact between these members and thus, undesirable sound.

In the present invention, the seat belt is sandwiched between the first gripping member and the second gripping member to prevent extraction of the seat belt in emergency situations such as a vehicle collision.

With the seat belt retractor of the present invention, the sleeve includes a flange. This flange is preferably disposed between the second gripping member and the side walls of the frame.

This arrangement prevents metal-to-metal contact between the second gripping member and the side walls of the frame and thus, undesirable sound.

Preferably, the seat belt retractor of the present invention includes a reel lock mechanism adapted to lock the reel in emergency situations.

BEST MODE FOR CARRYING OUT THE INVENTION

One embodiment of the present invention will now be described with reference to the drawings.

Figure 1:
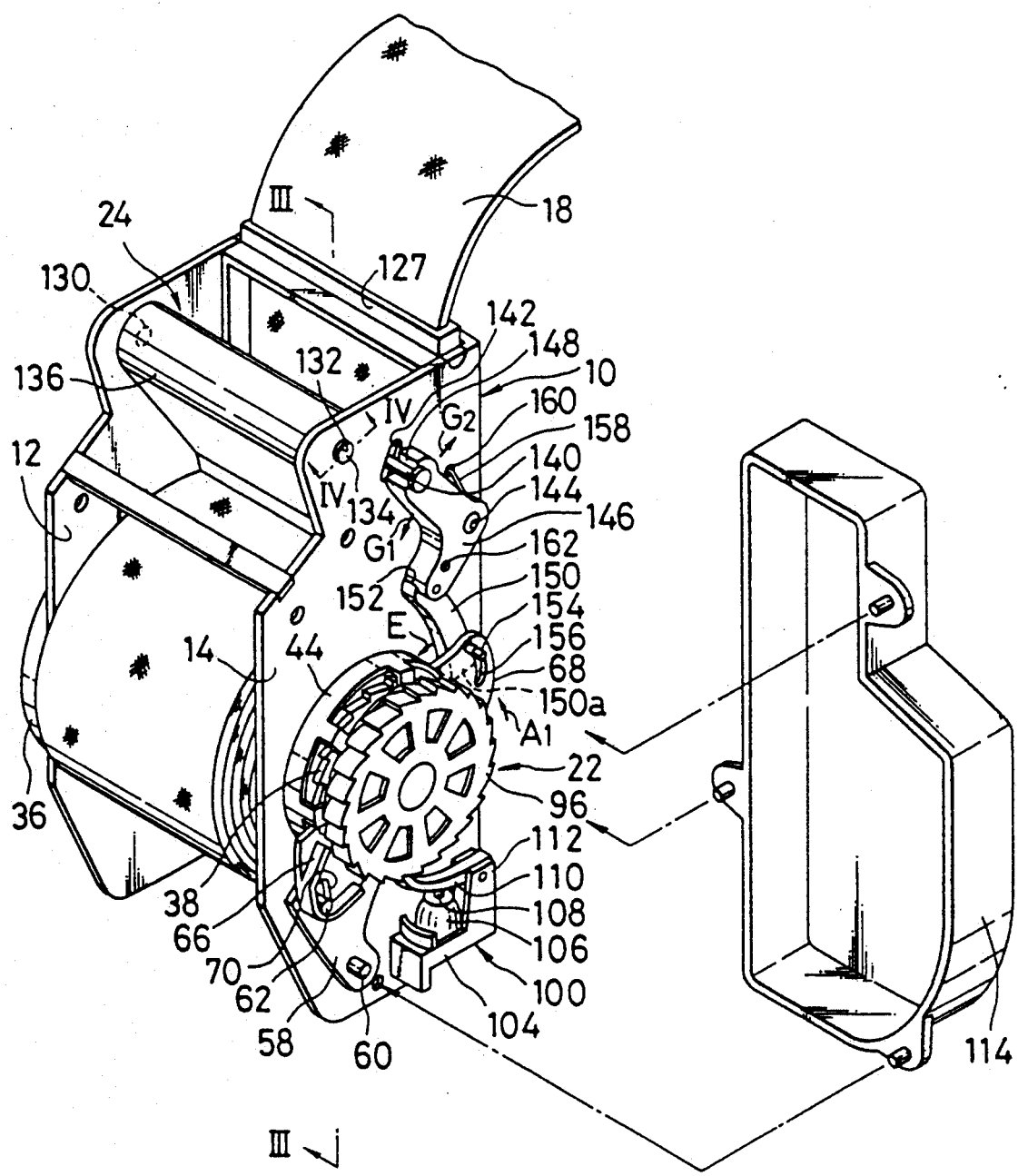
FIG. 1 is a perspective view of a seat belt retractor according to one embodiment of the present invention.
Figure 2:
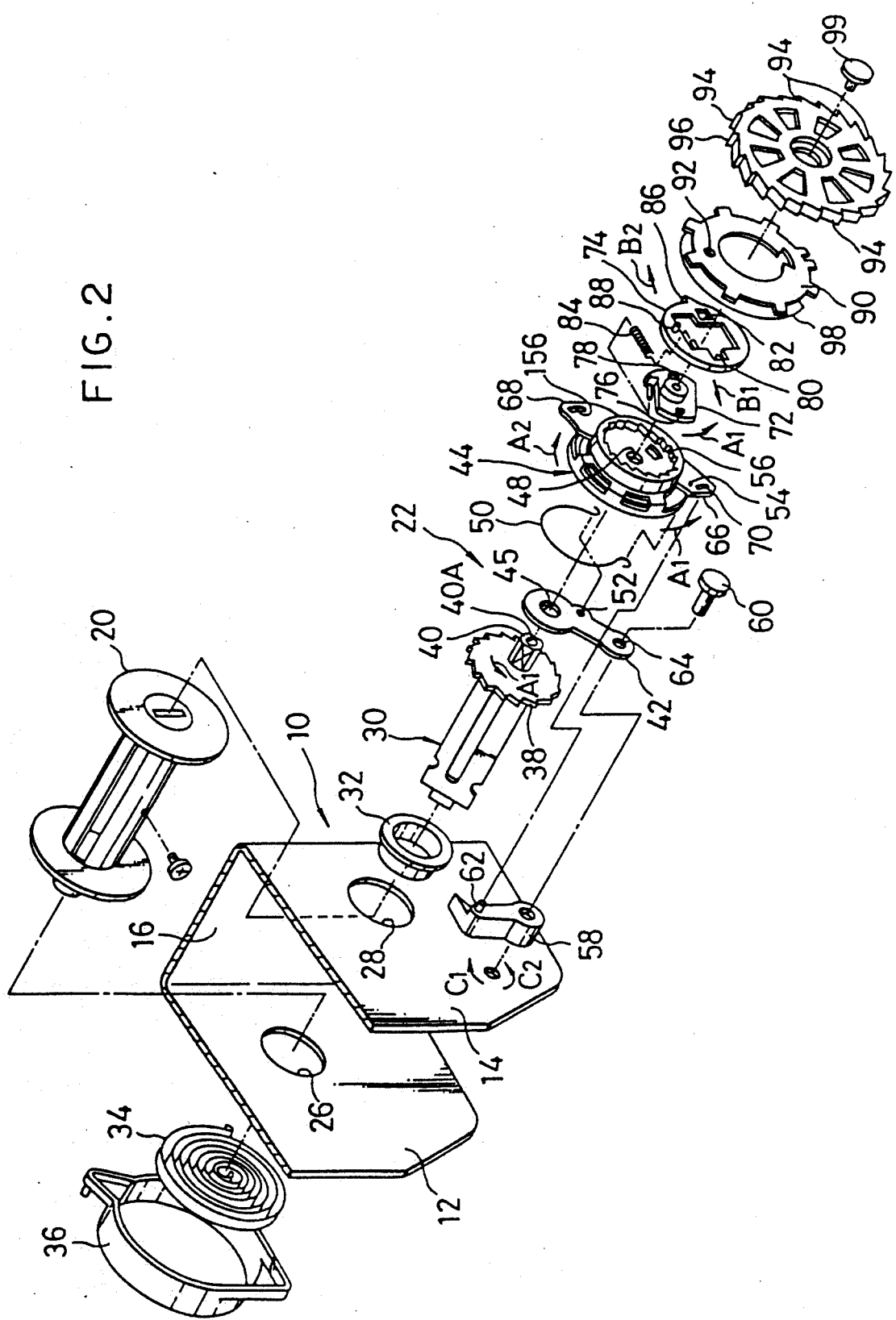
FIG. 2 is an exploded view, in perspective, of a reel lock mechanism.
Figure 3:
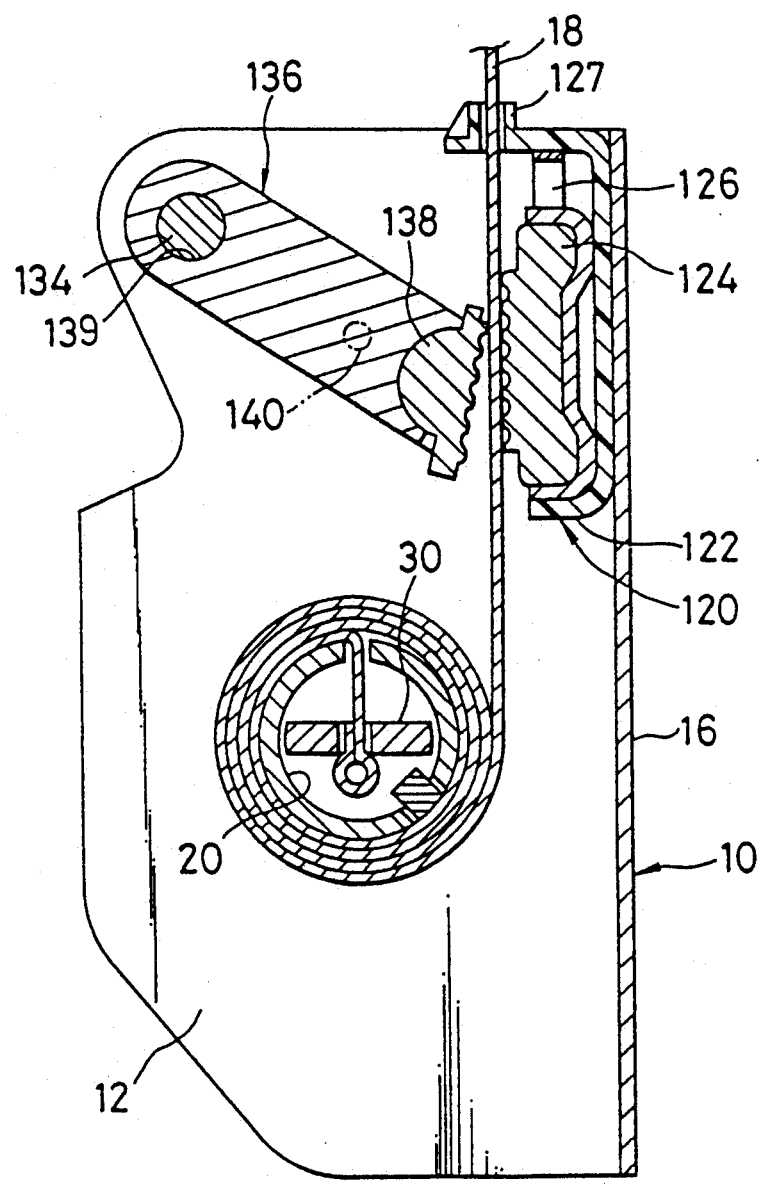
FIG. 3 is a vertical sectional view of the seat belt retractor taken on the line III—III in FIG. 1.
Figure 4:
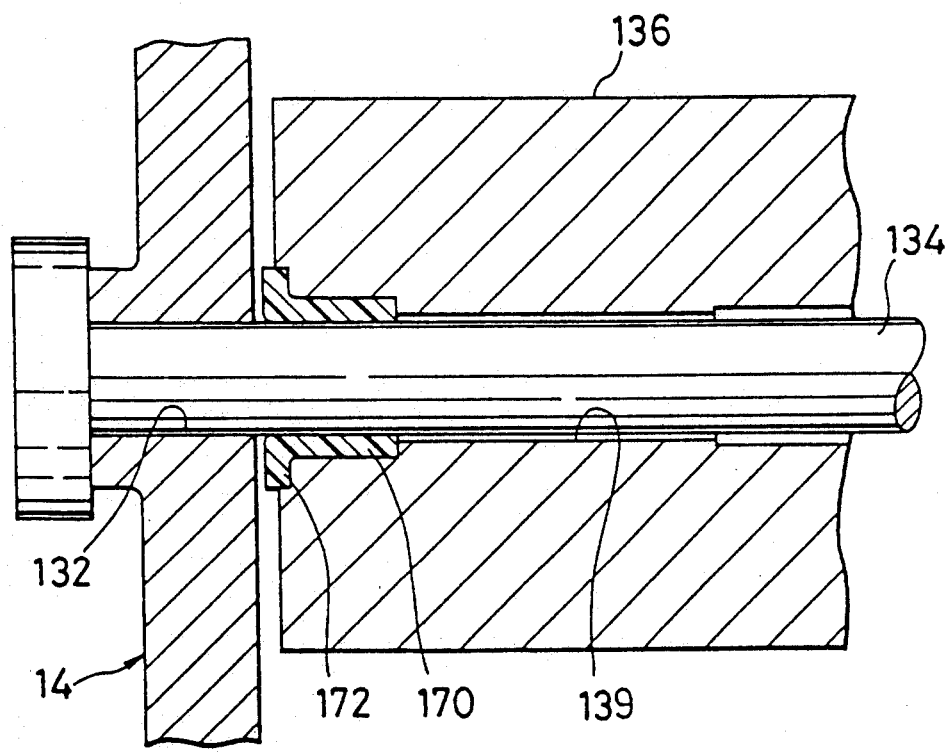
FIG. 4 is a sectional view taken on the line IV—IV in FIG. 1.
Figure 5:
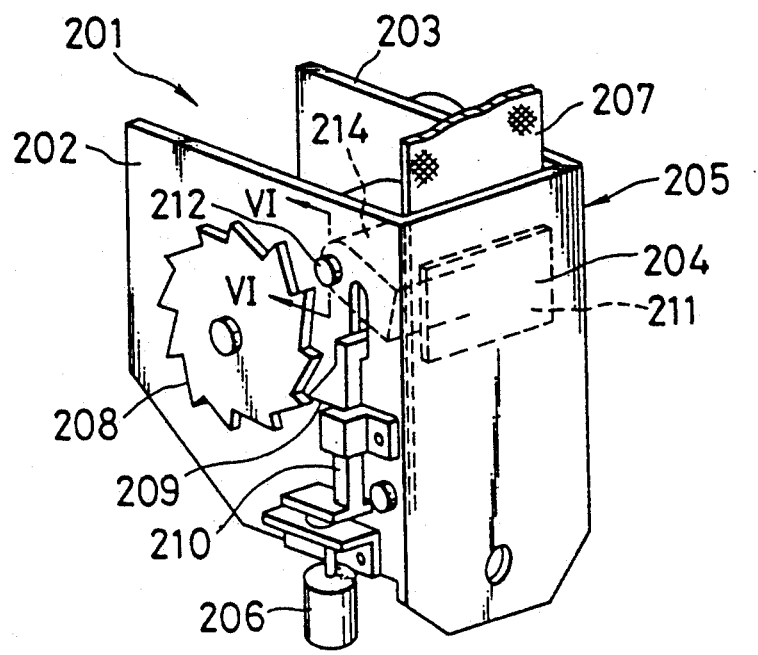
FIG. 5 is a perspective view of a conventional seat belt retractor.
Figure 6:
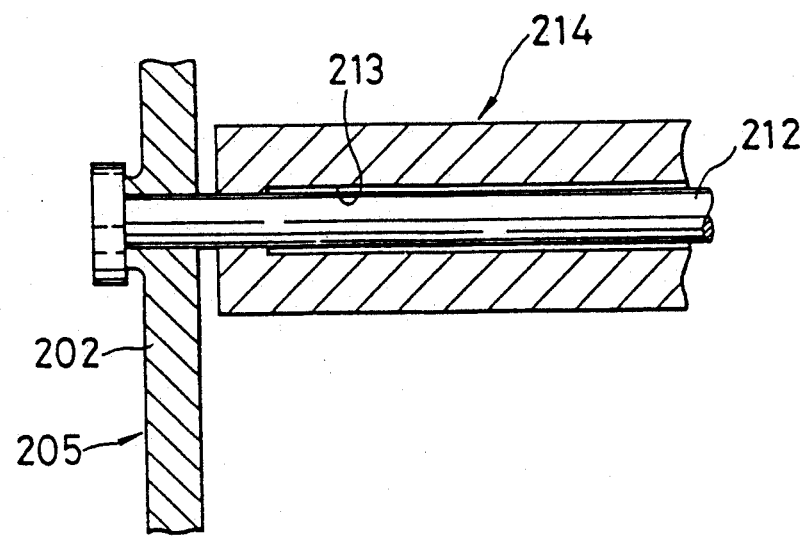
FIG. 6 is a sectional view taken on the line IV—IV in FIG. 5.

FIG. 1 is a perspective view of a seat belt retractor according to one embodiment of the present invention, from which a soundproof cover is removed. FIG. 2 is an exploded perspective view of a reel lock mechanism. FIG. 3 is a vertical sectional view of the seat belt retractor taken on the line III—III in FIG. 1. FIG. 4 is a sectional view taken on the line IV—IV in FIG. 1.

A frame 10 includes a pair of parallel side walls 12, 14, and a rear wall 16 extending between the side walls 12, 14. A reel 20 is mounted to the lower part of the frame 10 to take up a seat belt 18. A lock mechanism is also mounted to the lower part of the frame 10 to lock the reel 20 in emergency situations. A belt lock mechanism 24 is mounted to the upper part of the frame 10 to prevent extraction of the seat belt from the reel 20 in emergency situations.

The reel lock mechanism 22 will now be described with reference mainly to FIG. 2.

Two support openings 26, 28 are coaxially formed in the side walls 12, 14 to receive a reel shaft 30 through bushings 32 made of synthetic resin. The reel shaft 30 is rotatable about its own axis. The reel 20 is fit around the reel shaft 30.

A return spring 34 has a central end connected to one end of the shaft 30. The outer end of the return spring 34 is secured to the side wall 12 through a cover 36. When the seat belt 18 is extracted, the reel 20 is rotated to allow the return spring 34 to store energy. When the seat belt is released, the reel 20 is rotated under the action of the return spring 34 to allow for automatic winding of the seat belt 18 on the reel 20. The reel 20 and the reel shaft 30 are rotated in the direction of the arrow $A_1$ when the seat belt 18 is extracted.

The reel lock mechanism 22 is mounted to the outer surface of the side wall 14.

The reel lock mechanism 22 includes a ratchet wheel 38 integral with the other end of the reel shaft 30. A pin 40 extends outwardly from the ratchet wheel 38 in a coaxial relation to the shaft 30. A tie plate 42 has an opening 45 to receive the pin 40. A lock ring 44 has a central opening 48 in which the pin 40 is loosely fit. 50 is an arcuate spring element having one end engaged with an engagement hole 52 (spring hanger) which is formed substantially centrally in the tie plate 42, and the other end engaged with an engagement hole (spring hanger) 54 of the lock ring 44. The lock ring 44 has internal teeth 56. The spring element 50 extending between the spring hanger 54 of the lock ring 44 and the spring hanger 52 of the tie plate 42 provides a biasing force to rotate the lock ring 44 in the direction of the arrow $A_2$.

A control lever 58 has a base end pivotally connected to the side wall 14 of the frame 10 by a pivot pin 60. The other, free end of the control lever 58 is engageable with the ratchet wheel 38. A pin 62 extends from one side of the control lever 58. The pivot pin 60 extends through an opening 64 which is formed in the front end of the tie plate 42.

The lock ring 44 has a pair of diametrically opposite integral tabs 66 and 68. The tab 66 is adapted to rotate the control lever 58. The tab 68 is adapted to operate the belt lock mechanism 24.

The tab 66 of the lock ring 44 has an elongated hole 70 to receive the pin 62 of the control lever 58.

A hook retainer 72 is secured to the pin 40 of the shaft 30 which extends through the central opening 48 of the lock ring 44. Diametrically opposite projections 76 and 78 extend from the peripheral edge of the hook retainer 72 to support a hook 74. The hook 74 has two openings 80 and 82 to receive the projections 76 and 78. This allows the hook 74 to move to and from the hook retainer 72 along the line extending between the projections 76 and 78 (shown by the arrows $B_1$ and $B_2$).

A compression coil spring 84 is disposed between the hook retainer 72 and the hook 74 to urge the hook 74 in the direction of the arrow $B_1$. A pawl 86 extends from the outer peripheral edge of the hook 74 to engage with the internal teeth of the lock ring 44. A connecting pin 88 extends from the outer side of the hook 74.

The hook 74 is normally urged in the direction of the arrow $B_1$ under the influence of the compression coil spring 84 or shifted to the left in FIG. 2. As a result, the pawl 86 is separated from the internal teeth 56.

A frictional lock member 90 is substantially in the form of a ring and has an opening 92 adjacent its outer peripheral edge to receive the connecting pin 88. A flywheel 96 is fit over the frictional lock member 90 and includes a ratchet 94. The flywheel 96 has a central opening in which the pin 40 of the shaft 30 is loosely fit. The flywheel 96 is in the form of a short cylinder to receive the frictional lock member 90. An arcuate spring 98 is fit on the outer periphery of the frictional lock member 90 and slidably urged against the inner periphery of the flywheel 96. The flywheel 96 is slid around the frictional lock member 90 while friction is applied to the flywheel 96. 99 is a rivet fit into a bore 40A of the pin 40 to hold the flywheel 96 in position.

As shown in FIG. 1, an actuator 100 is mounted to the side wall 14 of the frame 10 and generally includes a case 104 fixed to the side wall 14, a barrel shaped operating element 106 loosely fit within the case 104, an operating lever 110 including a protrusion 108 in contact with the upper surface of the operating element 106, and a support 112 adapted to pivotally support the proximal end of the operating lever 110.

As shown in FIG. 1, a cover 114 surrounds the reel lock mechanism assembled as shown in FIG. 4.

With the retractor of the seat belt thus constructed, the operating lever 110 is disengaged from the flywheel 96 when the seat belt 18 is extracted by the occupant. The reel 20 and the shaft 30 are free to rotate to allow extraction of the seat belt 18. If the seat belt 18 is released, then the shaft 30 is rotated under the influence of the return spring 34 within the cover 36 so as to wind the seat belt 18 around the reel 20.

If there is a substantial change in the speed of a vehicle, for example, in the case of a collision, the actuator 100 is rendered operative to inhibit extraction of the seat belt 18. That is, when substantial acceleration is applied to the actuator 100, then the operating barrel 106 is inclined to cause the protrusion 108 to raise the operating lever 110. The distal end of the operating lever 110 is then brought into engagement with the ratchet 94 to stop the flywheel 96.

Stoppage of the flywheel 96 results in corresponding stoppage of the frictional lock member 90. On the other hand, the seat belt 18 tends to be extracted during crash to cause the reel shaft 30 to rotate in the direction of the arrow $A_1$. As the reel shaft 30 rotates, the hook retainer 72 and the hook 74 are caused to rotate in the direction of the arrow $A_1$. However, the hook 74 can not be rotated since the frictional lock member 90 is prevented from rotating as a result of engagement with the pin 88. Under the circumstances, the hook 74 is slid in the direction of the arrow $B_2$ a distance corresponding to the rotation of the hook retainer 74 in the direction of the arrow $A_1$. The pawl 86 is then brought into engagement with the internal teeth 56 of the lock ring 44.

Thus, the lock ring 44 is rotated in the direction of the arrow A₁ as in the rotation of the reel shaft 30 to allow the the tab 66 to rotate the control lever 58 in the direction of the arrow C₁ as the pin 62 is engaged with the elongate hole 70. The free end of the control lever 58 is then brought into engagement with the ratchet wheel 38 of the reel shaft 30 to firmly lock the reel shaft 30 and the reel 20.

The construction of the belt lock mechanism 24 will next be described with reference to FIGS. 1, 3, and 4.

A first gripping member 120 is attached to the rear wall 16 of the frame 10 and includes a holder 122 secured to the rear wall 16, a receiver 124 held by the holder 122 and vertically moved along the rear wall 16, and a spring 126 disposed to urge the receiver in a downward direction. The receiver 124 has a rugged front surface. The holder 122 has a guide or slit 127 at its upper end to guide the seat belt 18.

A pair of openings 130 and 132 are coaxially formed in the side walls 12 and 14 of the frame 10. A shaft 134 extends between the openings 130 and 132. A second gripping member 136 has a support hole 139 through which the shaft 134 extends to rotatably mount the second gripping member 136 to the frame 10.

As shown in FIG. 3, a semicylindrical pusher 138 is attached to the free end of the second gripping member 136 and has a rugged surface in a face-to-face relation to the receiver 124. The seat belt 18 extends between the pusher 138 and the receiver 124.

A pin 140 (FIG. 3) extends from one side of the second gripping member 136 into an elongate hole 142 which is formed in the side wall 14 of the frame 10.

A pivot pin 144 extends from the outer surface of the side wall 14 of the frame 10. A locker arm 146 is pivotale about the pivot pin 144. The locker arm 146 is bent to a L-shape. A recess 148 is formed at one end of the locker arm 146 to engage with the pin 140. A joint 152 is provided at the other end of the locker arm 146. A lever 150 has an upper end pivotally connected to the joint 152 so as to rotate by a very small angle.

The lower end of the lever 150 overlaps with the tab 68 of the lock ring 44. A pin 154 extends from the lever 50 into an elongated hole 156 of the tab 68.

A spring 158 extends around the pivot pin 144 and has one end fit into an opening 160 of the side wall 14 of the frame 10 and the other end fit into an opening 162 of the locker arm 146. The spring 158 urges the locker arm 146 in the direction of the arrow G₁.

Reference will now be made to the operation of the belt lock mechanism 24 thus far constructed.

When the vehicle is in a nonemergency situation, the locker arm 146 is urged in the direction of the arrow G₁ under the action of the spring 158 to press the pin 140 in the same direction. This causes the pusher 138, which is connected to the free end of the second gripping member 136, to separate from the receiver 124 of the first gripping member 120. Under the circumstances, the seat belt 18 is free to pass between the pusher 138 and the receiver 124.

In an emergency situation or during crash, the operating element 106 of the actuator 100 is inclined to allow the operating lever 110 to engage with the ratchet 94 of the flywheel 96. The lock ring 44 is then rotated in the direction of the arrow A₁. Thereafter, the seat belt 18 is locked in the following steps.

1. The tab 68 of the lock ring is rotated in the direction of the arrow A₁ to cause the pin 154 to move toward the lower end of the elongated hole 156. That is, the lever 150 is rotated in the direction of the arrow E.

2. Rotation of the lever 150 causes a leading end 150a to engage with the ratchet wheel 38.

3. As the ratchet wheel 38 rotates, the lever 150 is raised. That is, the locker arm 146 is rotated about the pin 144 in the direction of the arrow G₂ to press the pin 140 in the same direction (An elongated hole 70 is shaped so that at this time, the control lever 58 is not yet in engagement with the ratchet wheel 38).

4. As a result, the pusher 138 of the second gripping member 136 is moved toward the receiver 124 of the first gripping member 120 to grip the seat belt 18 therebetween.

5. Once the seat belt 18 is sandwiched between the pusher 138 and the receiver 124, extraction of the seat belt 18 causes the pusher 138 and the receiver 124 to move toward one another so as to strongly grip the seat belt 18 between the pusher 138 and the receiver 124. The seat belt 18 is thus locked and can no longer be extracted.

As shown in FIG. 4, a sleeve or bushing 170 is made of synthetic resin and fit around the shaft 134 to leave a slight clearance between the inner peripheral surface of a support hole 139 and the outer peripheral surface of the shaft 134. This prevents metal-to-metal contact between the metallic shaft 134 and the metallic gripping member 136 and thus, undesirable sound which may otherwise occur due to contact of the shaft 134 with the gripping member 136.

When the vehicle is in an emergency situation, the second gripping mmber 136 cooperates with the first gripping member 120 to firmly sandwich the seat belt 18. At this time, substantial force is applied to the second gripping member 136. Under the circumstances, the sleeve 170 is resiliently deformed to cause direct contact between the support hole 139 and the shaft 134. This allows the shaft 134 to directly support the second gripping member 136. The second gripping member 136 can firmly be held in the frame 10 if substantial force is applied thereto. When the external force is released, the sleeve 170 is resiliently returned to its original state to allow the shaft 134 to support the second gripping member 136 again through the sleeve 170..

In the illustrated embodiment, the sleeve 170 has a flange 172 located between the second gripping member 136 and the side walls 12, 14 of the frame 10. This also prevents metal-to-metal contact between the second gripping member 136 and the side walls 12, 14 and thus, undesirable sound due thereto.

INDUSTRIAL APPLICABILITY

The seat belt retractor of the present invention thus far described prevents metal-to-metal contact between the second gripping member and the shaft which supports the second gripping member and thus, undesirable sound.

The present invention also prevents metal-to-metal contact between the second gripping member and the side walls of the frame and thus, undesirable sound due thereto.

In the present invention, the seat belt is firmly locked by the belt lock mechanism and the reel lock mechanism to provide a fail-safe mechanism.

We claim:

1. A seat belt retractor comprising:
    a frame including a pair of opposite side walls and a rear wall extending between the side walls;

a seat belt take-up reel situated between the side walls of the frame and adapted to hold a seat belt therearound;

a first gripping member mounted on the rear wall of the frame;

a shaft extending between the side walls of the frame;

a second gripping member having a support hole at one side and a pusher at a side opposite to the support hole, said second gripping member being situated between the side walls and rotatably held by the shaft extending through the support hole, said second gripping member being rotatable between a first position where the pusher overlaps the first gripping member to hold the seat belt therebetween, and a second position where the pusher is located away from the first gripping member;

lock actuating means for moving the second gripping member to the first position upon detection of a predetermined deceleration of a vehicle; and a sleeve made of synthetic resin and having a cylindrical portion and a flange extending radially outwardly from one end of the cylindrical portion, said cylindrical portion being located inside a part of the support hole and the flange projecting outwardly from an outer surface of the second gripping member in a direction coaxially with the support hole, said second gripping member being supported by the shaft through the sleeve when the predetermined deceleration of the vehicle is not detected so that the second gripping member does not directly contact the shaft and the frame to reduce noise thereagainst, said sleeve being resiliently deformed to allow the second gripping member to directly contact the shaft when the predetermined deceleration is detected so that the seat belt is securely retained between the first gripping member and the pusher.

2. A seat belt retractor according to claim 1, wherein said second gripping member has a dent having a size corresponding to the flange of the sleeve so that when the sleeve is inserted into the support hole, the flange is situated inside the dent while an outer surface of the flange projects outwardly from the outer surface of the second gripping member.

3. A seat belt retractor according to claim 1, further comprising a reel lock mechanism to lock the reel upon detection of the predetermined deceleration.

* * * * *